United States Patent
Thyagarajan et al.

(10) Patent No.: US 10,390,293 B2
(45) Date of Patent: Aug. 20, 2019

(54) MEASUREMENT CONTROL FOR UE RELAY SELECTION IN PROSE BASED UE-TO-NETWORK RELAY

(71) Applicant: Nokia Solutions and Networks Oy, Espoo (FI)

(72) Inventors: Manivannan Thyagarajan, Coppell, TX (US); Hai Tao Li, Beijing (CN); Vinh Van Phan, Oulu (FI); Ling Yu, Kauniainen (FI); Ilkka Antero Keskitalo, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/752,770

(22) PCT Filed: Aug. 19, 2015

(86) PCT No.: PCT/US2015/045796
§ 371 (c)(1),
(2) Date: Feb. 14, 2018

(87) PCT Pub. No.: WO2017/030572
PCT Pub. Date: Feb. 23, 2017

(65) Prior Publication Data
US 2018/0255505 A1 Sep. 6, 2018

(51) Int. Cl.
| | |
|---|---|
| H04W 48/16 | (2009.01) |
| H04W 8/00 | (2009.01) |
| H04J 11/00 | (2006.01) |
| H04W 36/00 | (2009.01) |
| H04W 36/30 | (2009.01) |

(Continued)

(52) U.S. Cl.
CPC ......... *H04W 48/16* (2013.01); *H04J 11/0069* (2013.01); *H04W 8/005* (2013.01);
(Continued)

(58) Field of Classification Search
CPC ... H04W 72/04; H04W 8/005; H04W 72/082; H04W 76/14; H04W 72/02; H04W 88/04;
(Continued)

(56) References Cited

U.S. PATENT DOCUMENTS

| | | | |
|---|---|---|---|
| 2014/0056220 A1* | 2/2014 | Poitau | H04W 76/14 370/328 |
| 2014/0329535 A1* | 11/2014 | Sadiq | H04W 76/14 455/452.2 |

(Continued)

OTHER PUBLICATIONS

"On Relay Selection/Reselection for UE-to-Network Relays," InterDigital Communications, 3GPP TSG-RAN WG2 #90, R2-152680, May 25-29, 2015, Fukuoka, Japan, 4 pgs.
(Continued)

*Primary Examiner* — Jung Liu
(74) *Attorney, Agent, or Firm* — Harrington & Smith

(57) ABSTRACT

Methods, devices, systems, techniques, and computer program products are provided in which an eNB, within a wireless communications network, determining network coverage status relating to a cell served by it, where the eNB supports UE-to-Network relay for a remote UE using direct device-to-device communication between the remote UE and a relay UE connected to the serving cell. Based on a determination of network coverage status, at least one UE is initiated and selected to act as a relay UE. The radio interface link quality of the relay UE can be evaluated and the relay UE can be configured to send an indication of the radio interface link quality to the remote UE. Based on the determined network coverage status and selection of a relay UE, the remote UE is controlled by the eNB for the relay UE discovery and selection either directly or via the relay UE.

19 Claims, 3 Drawing Sheets

(51) Int. Cl.
  *H04W 88/04* (2009.01)
  *H04W 76/14* (2018.01)
  *H04W 84/04* (2009.01)
(52) U.S. Cl.
  CPC ........ *H04W 36/03* (2018.08); *H04W 36/0088* (2013.01); *H04W 36/0094* (2013.01); *H04W 36/30* (2013.01); *H04W 76/14* (2018.02); *H04W 84/045* (2013.01); *H04W 88/04* (2013.01)
(58) Field of Classification Search
  CPC ............. H04W 72/0406; H04W 52/38; H04W 52/383; H04W 72/042; H04W 92/18; H04W 72/0413; H04L 5/0007
  See application file for complete search history.

(56) References Cited

U.S. PATENT DOCUMENTS

| | | | |
|---|---|---|---|
| 2015/0215903 A1* | 7/2015 | Zhao | H04W 72/04 370/329 |
| 2015/0264677 A1* | 9/2015 | He | H04W 72/02 370/312 |
| 2015/0327201 A1* | 11/2015 | He | H04W 48/16 370/336 |
| 2016/0183219 A1* | 6/2016 | Kim | H04W 72/0406 370/329 |

OTHER PUBLICATIONS

"Revised WI: Enhanced LTE Device to Device Proximity Services," Qualcomm Incorporated, 3GPP TSG-RAN Meeting #67, RP-150441, Mar. 9-12, 2014, Shanghai, China, 8 pgs.

"Discussion on UE-to-Network Relay Selection," Nokia Networks, 3GPP TSG-RAN WG2 Meeting #90, R2-152581, May 25-29, 2015, Fukuoka, Japan, 3 pgs.

"eNB Involvement in Remote UEs Authorization and Connection Establishment," ZTE, 3GPP TSG-RAN WG2 #91, R2153768, Aug. 24-28, 2015, Beijing, P.R. China, 3 pgs.

* cited by examiner

MEASUREMENT CONTROL FOR UE RELAY SELECTION IN PROSE BASED UE-TO-NETWORK RELAY

TECHNICAL FIELD

The present application relates generally to Proximity Services (ProSe)/Device-to-device (D2D) enhancement.

BACKGROUND

ProSe UE-to-network relay has been the subject of agreement for example at the 3GPP RAN2#89bis meeting.

In RAN2 contribution (R2-152581), relay selection and reselection were discussed. It mentioned that good PC5 link and Uu link are important for a remote UE to work under the relay UE. It also concluded that PC5 link measurement performed by remote UE and Uu link measurement assistance provided by relay UE together with higher layer criteria can be utilized by remote UE to perform relay reselection. However, while goals might have been discussed no solutions were provided.

In contrast, our subject matter, disclosed herein below, teaches solutions not envisioned by these references.

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:
  3GPP: third generation partnership project;
  D2D: Device to Device;
  eNB or eNodeB: base station, evolved Node B;
  L3: Layer 3
  LTE: long term evolution;
  LTE-A: long term evolution—advanced;
  MME: Mobility Management Entity;
  PC5: UE-to-UE direct interface
  ProSe: Proximity Services;
  QoS: Quality of Service;
  RRC: Radio Resource Control
  SIB: System Information Block
  SGW: Serving Gateway;
  SoC: Software on a chip;
  DL: downlink
  UE: user equipment;
  UL: uplink
  Uu: radio interface between the UE and the eNB;
  v1, v2, etc.: Version 1, version 2, etc.

SUMMARY

A current objective, as discussed further herein, involves minimizing service interruption. Two scenarios related to mobility of a remote UE with regard to serving network coverage are addressed, namely, a remote UE moving from in-coverage to out-of-coverage and from out-of-coverage to in-coverage. In addition, a remote UE may remain outside of network coverage and move from the proximity of one relay UE to that of another relay UE causing a possible reselection of relay UE.

To achieve such goals, regardless of the extent to which eNB is involved in such process, cell and/or relay user equipment discovery and selection/re-selection based on a remote user equipment's measurement and decision would be required.

Typically, there are downsides associated with cell and/or relay UE discovery and selection/reselection. For example, the discovery of a cell and/or relay UE or the selection/ reselection of a cell and/or relay UE can cause additional UE power consumption and, in some cases, data interruption, which, as an undesirable result, generates measurement gaps for RF capability-limited UEs. Therefore, such measurement and selection need to be performed in an economical way and must minimize service interruption or enhance the quality of service (QoS) for remote UE.

The current invention addresses the control of remote UE measurement and control of remote UE selection/reselection of a relay UE. The current invention addresses questions such as when does a remote UE start/stop measurement on neighbor cells/relay UEs and questions such as how does a remote UE take into account the quality of the PC5 radio link between the remote UE and the relay UE as measured by the remote UE and how does the remote UE take into account the quality of Uu radio link of the relay UE as indicated by the relay UE, in addition to taking into account the actual service needs and the service requirements of the remote UE.

Various aspects of examples of the invention are set out in the claims.

According to a first aspect of the present invention, a method comprises determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

According to a second aspect of the present invention, a method comprises receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An additional exemplary embodiment includes a computer program, comprising code for determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection. The computer program according to this paragraph, wherein the computer program is a computer program product comprising a computer-readable medium bearing computer program code embodied therein for use with a computer.

An additional exemplary embodiment includes a computer program, comprising code for receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE. The computer program according to this paragraph, wherein the computer program is a computer program product comprising a computer-readable medium bearing computer program code embodied therein for use with a computer.

An additional exemplary embodiment includes a computer program, comprising code for determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection. The computer program according to this paragraph, wherein the computer program is a computer program product comprising a computer-readable medium bearing computer program code embodied therein for use with a computer.

An additional exemplary embodiment includes a computer program, comprising code for receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An exemplary apparatus includes one or more processors and one or more memories including computer program code. The one or more memories and the computer program code are configured to, with the one or more processors, cause the apparatus to perform at least the following: receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An exemplary apparatus could also include various means for determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An exemplary apparatus could also include various means for receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An exemplary computer program product includes a computer-readable storage medium bearing computer program code embodied therein for use with a computer. The computer program code includes code for: determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An exemplary computer program product includes a computer-readable storage medium bearing computer program code embodied therein for use with a computer. The computer program code includes code for: receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

BRIEF DESCRIPTION OF THE DRAWINGS

For a more complete understanding of examples of embodiments of the present invention, reference is now made to the following descriptions taken in connection with the accompanying drawings in which.

Figure 1:
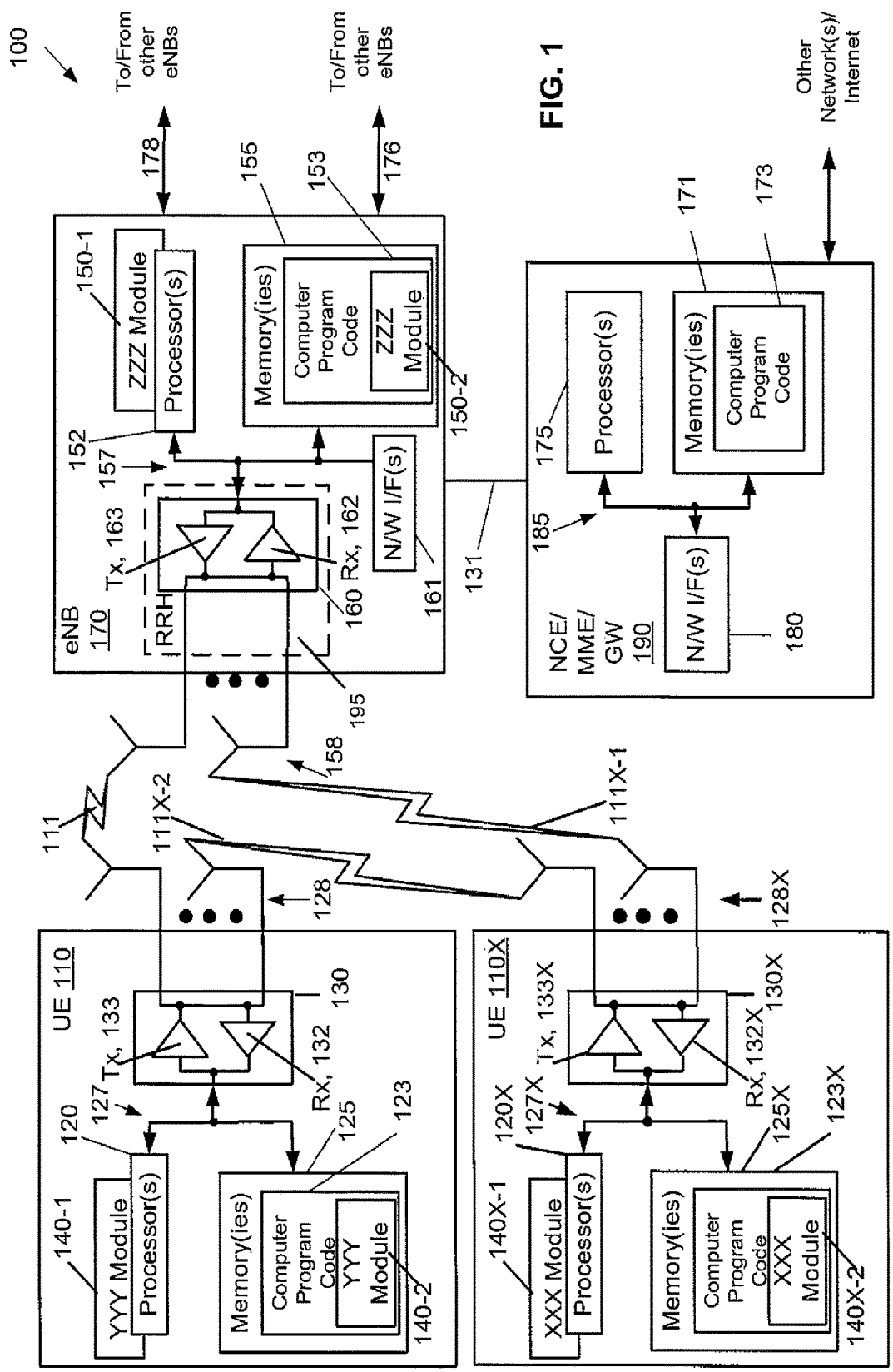
FIG. 1 is a block diagram of an exemplary system in which the exemplary embodiments may be practiced.

The word "exemplary" is used herein to mean "serving as an example, instance, or illustration." Any embodiment described herein as "exemplary" is not necessarily to be construed as preferred or advantageous over other embodiments. All of the embodiments described in the Detailed Description are exemplary embodiments provided to enable persons skilled in the art to make or use the invention and not to limit the scope of the invention which is defined by the claims.

DETAILED DESCRIPTION OF THE DRAWINGS

This invention addresses issues involving how a remote UE can optimally (i.e., when and how often) perform relay UE discovery/selection/reselection and how the network controls the remote UE in this process.

The network control involves the control of the remote UE measurement process and the actual relay UE selection/reselection process.

One of the criteria for network control is based on the so called "network coverage status" from a cell perspective (e.g. normal coverage or isolated/edge of network coverage). Other criteria for network control could be based on preconfigured QoS parameters or service continuity requirements (i.e. minimized service interruption). Measurement control of remote UE could be based on preconfigured or dynamic signaled thresholds, offsets, and/or associated time intervals. A goal of embodiments of the present invention can be, for example to prevent the remote UE from unnecessarily performing relay discovery and relay selection/reselection to conserve UE power and to minimize service interruption. Note, for example, that since the relay functionality is to ensure service continuity for a remote UE, the relay function targets a UE either in RRC_CONNECTED state served by a cell or in direct D2D communication with the relay UE directly over PC5 link.

Thus, the invention defines enhancements to D2D communication to enable supporting the extension of network coverage using, for example, L3-based UE-to-Network Relays, including service continuity (if needed), based on Release 12 D2D communication, considering applicability to voice, video as examples.

The invention involves the potential minimization of service interruption for the cases where the UE is moving from in-coverage to out-of-coverage, from out-of-coverage to in-coverage, and even from one out-of-coverage location to another out-of-coverage location. The remote UE can take radio level measurements of the PC5 radio link quality.

For out-of-coverage, the radio level measurements can be used by the remote UE together with other higher layer criteria to perform relay selection.

For in-coverage, these measurements could be used by the UE to perform selection similar to out-of-coverage case, or they can be reported to the eNB. The reselection could be handled and/or performed by various wireless network devices. Moreover, Uu link quality can be used for selection/reselection purposes.

For in-coverage scenarios, for relay discovery purposes from the remote UE, the monitoring and transmitting resources for discovery are provided, for example, by the eNB using the Rel-12 mechanisms (broadcast for idle mode and dedicated signaling for connected mode). The remote UE can decide when to start monitoring. The eNB can control when the remote UE starts using or requesting the resources for transmission purposes or this can be done by another device.

An invented method teaches determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

Another invented method teaches receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

Figure 2:
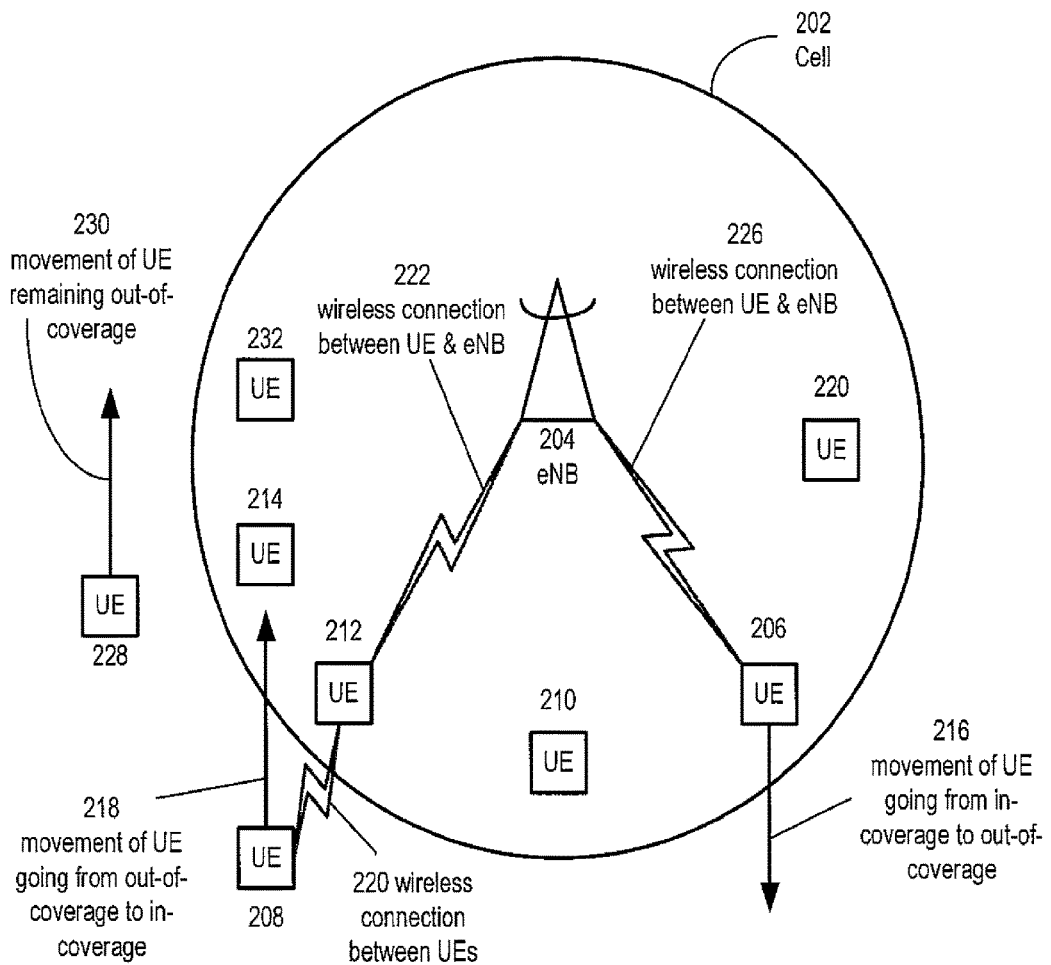
FIG. 2 is also a diagram of an exemplary system in which the exemplary embodiments may be practiced.
Figure 3:
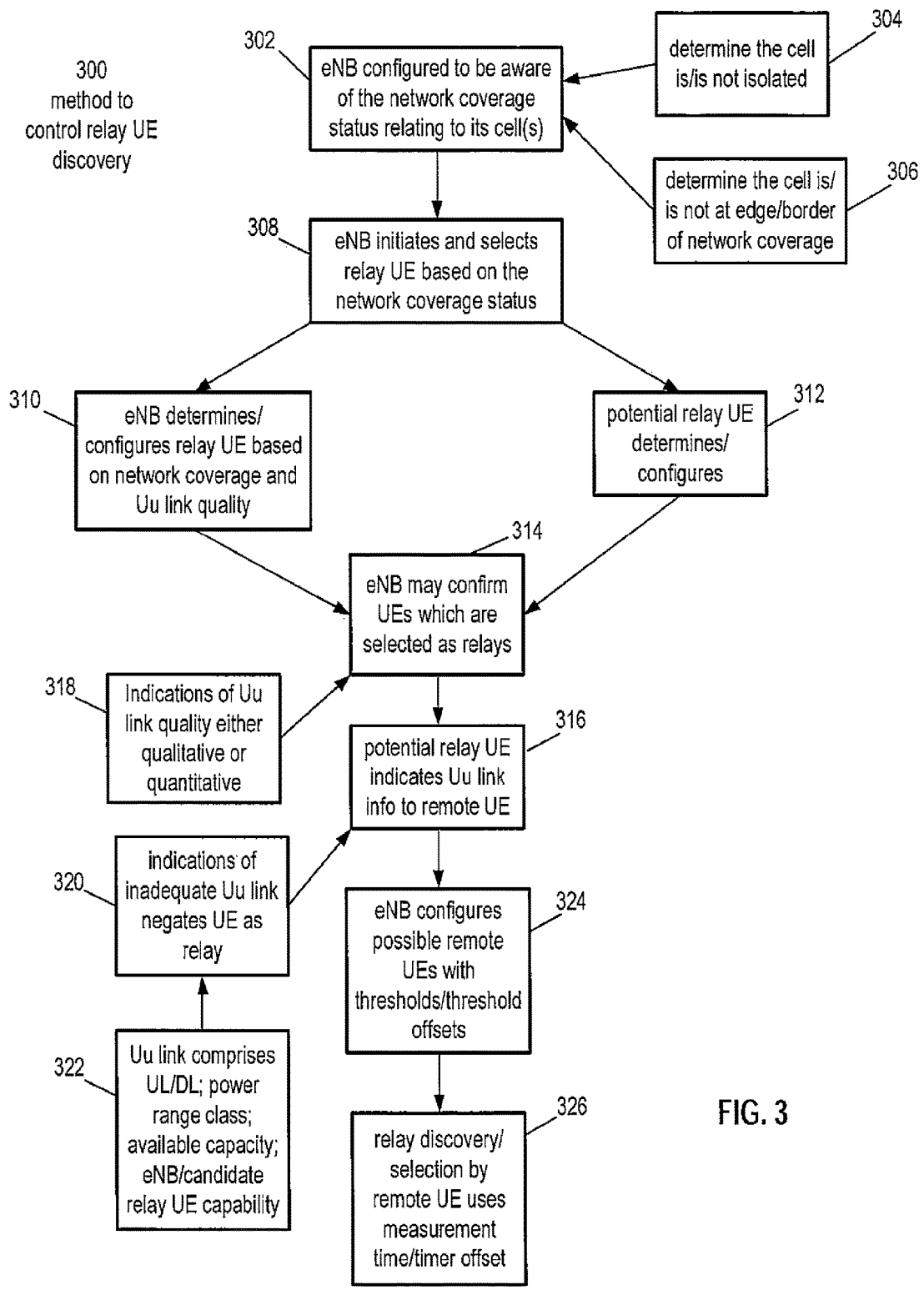
FIG. 3 is a flow diagram showing operations for an exemplary method of the determining a suitable relay UE.

An example of embodiments of the present invention and its potential advantages are understood by referring to FIG. 1 through FIG. 3 of the drawings.

The examples of embodiments herein describe techniques for measurement control for UE relay selection in ProSe based UE-to-Network relay. Additional description of these techniques is presented after a system into which the examples of embodiments may be used is described.

This disclosure details steps to control the relay UE selection/reselection related radio measurement and decision-making of the remote UE in order to prevent the remote UE from constantly monitoring the discovery messages from other relay UEs or other neighbor cells while finding a proper relay UE for its service needs and requirements. Below, after a block diagram of an example of an embodiment of the system is described in detail, two different examples of cases relevant to the current invention are discussed. The first case discusses where the remote UE is connected with the eNB. The second case discusses where a remote UE is connected to the eNB via a relay UE.

FIG. 1 shows a block diagram of a system in which the examples of embodiments of the invention may be practiced.

The eNB 170 is a base station that provides access for wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a ZZZ module 150, comprising one of or both parts 150-1 and/or 150-2, which may be implemented in a number of ways. The methods discussed herein are assumed to be performed by the respective modules.

The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

Turning to remote user equipment in FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. If the UE 110 is not able to communicate with eNB 170 directly, then UE 110 may communicate with relay UE 110X via a wireless link 111X-2. Then relay UE 110 communicates with eNB via wireless link 111X-1. If the UE 110 does communicate with eNB 170, then it does so via wireless link 111.

The wireless network 100 may include a network control element (NCE) 190 that may include MME/SGW functionality, and which provides connectivity with a further network, such as a telephone network and/or a data communications network (e.g., the Internet). The eNB 170 and other eNBs are coupled via links 131 to the NCE 190. The links 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Turning to the relay user equipment in FIG. 1, a UE 110X is in wireless communication with a wireless network 100. The user equipment 110X includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The UE 110X includes a XXX module 140X, comprising one of or both parts 140X-1 and/or 140X-2, which may be implemented in a number of ways. The XXX module 140X may be implemented in hardware as XXX module 140X-1, such as being implemented as part of the one or more processors 120X. The XXX module 140X-1 may be implemented also as an integrated circuit or through other hardware such as a programmable gate array. In another example, the XXX module 140X may be implemented as XXX module 140X-2, which is implemented as computer program code 123X and is executed by the one or more processors 120X. For instance, the one or more memories 125X and the computer program code 123X may be configured to, with the one or more processors 120X, cause the user equipment 110X to perform one or more of the operations as described herein. The UE 110X communicates with eNB 170 via a wireless link 111X-1. The remote UE 110 communicates with the relay UEs 110X via a wireless link 111X-2.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors 152 and 175 and memories 155 and 171.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 and user equipment 110X can include, but are not limited to, cellular telephones such as smart phones, personal digital assistants (PDAs) having wireless communication capabilities, portable computers having wireless communication capabilities, image capture devices such as digital cameras having wireless communication capabilities, gaining devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 125X, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

The apparatus such as an eNB 170 can provide functionality to the operations described herein below. FIG. 3 is a block diagram of an example of a logic flow diagram that illustrates the operation of an example of a method, a result of execution of computer program instructions embodied on a computer readable memory, and/or functions performed by logic implemented in hardware, in accordance with exemplary embodiments herein. The blocks in the figure may be considered to be means for performing the function in the blocks. Furthermore, each block in FIG. 3 may be implemented as a module, such as a circuit or other hardware, for performing the function in the block. The blocks in FIG. 3 may be an example of an implementation of the ZZZ module in FIG. 1, such that the ZZZ module would be the module determining the relay UE. Thus, in FIG. 1, eNB 170, e.g., under control of the ZZZ module, performs the appropriate blocks in FIG. 3. The eNB 170 or ZZZ module of FIG. 1 could also be thought of as the means for performing the steps of the method or any aspects of the methods described herein or as illustrated in FIG. 3. Similarly, the YYY module may also be means of performing aspects of the method described herein. Additionally, the XXX module may also be means of performing aspects of the method described herein.

As noted above, prior to the detailed description of an example of an embodiment of a system, this disclosure describes steps to control the relay UE selection/reselection related radio measurement and decision-making of the remote UE in order to prevent the remote UE from constantly monitoring the discovery messages from other relay UEs or other neighbor cells while finding a proper relay UE for its service needs and requirements. Two different examples of cases relevant to the current invention involve a first case where the remote UE is initially within network coverage and connected with the eNB while a second case discusses a remote UE as initially out of the network. The remote UE is assumed later connected to the eNB via a relay UE.

FIG. 2 presents a diagram of a cell 202 served by eNB 204 and various user equipment either staying within the cell (UEs 210, 212, 214, and 220), exiting the cell (UE 206), entering the cell (UE 208), or always remaining outside the cell. The scenario where a UE stays within the cell for the whole time need not be discussed. The scenario where the UE moves from in-coverage to out-of-coverage is discussed below as a first case; the scenario where the UE moves from out-of-coverage to in-coverage is discussed below as a second case, and the scenario where the UE moves from out-of-coverage to out-of-coverage is discussed below as a third case.

The workings of eNB 204 would correspond the eNB 170, while UEs 206, 208, and 228 would correspond to remote UE 110, and UEs 210, 212, 214, 220, and 232 might all be potential relay UEs thus possibly corresponding to UE 110X.

Referring now to FIG. 2, a first case, where the remote UE is connected with the eNB 204, corresponds to a mobility scenario where a UE, designated as remote UE 206, moves from in-coverage to out-of-coverage vis-à-vis the cell 202.

A UE with good serving network coverage does not need to monitor potential relay UEs in the serving cell or another cell, where good means that a measured serving cell RSRP value is higher than a pre-defined threshold. However, when this UE 206 moves towards the edge of cell 202 and does not find a suitable neighboring cell, in case UE 206 is about to lose network coverage, there is a need for this UE 206 to discover and select a suitable relay UE and continue service via the selected relay UE connection. For example, UEs 210 and 220 could be thought of as potential relay UEs for UE 206 once UE 206 leaves cell 202 and the wireless connection 226 between UE 206 and eNB 204 would be severed. To control such relay UE discovery, the following novel aspects are proposed below.

The serving eNB 204 is configured to be aware of network-coverage status related to individual cells, such as cell 202, that serving eNB 204 provides. The network-coverage status of individual cells may specify whether the cell 202 is an isolated cell or not and if not then whether the cell 202 is currently at some edge or border of the network coverage.

For instance, a cell at a seaside may be considered at edge or border of the network coverage towards the sea. For another example, a cell has a pre-determined coverage hole or exclusion zone or has a pre-determined temporary loss of a macro-coverage neighboring cell that may be considered as being at edge or border of the network coverage. The serving eNB 204 may initiate and select UEs being in a connected state with the eNB to act as relay UEs (such e.g., UEs 210 and 220) based on the network-coverage status of the individual cells the serving eNB 204 is providing. The serving eNB 204 may also indicate the network-coverage status to relevant UEs (such as e.g., potential relay UEs and remote UE 206 inside the cell coverage) using SIB or dedicated signaling. Upon receiving this indication, relevant UEs may determine, e.g., whether to adjust configuration parameters related to the relay UE discovery and selection or not, and act accordingly.

Either the serving eNB 204 may determine and configure individual UEs acting as possible relay UEs (such e.g., UEs 210 and 220) with Uu link quality to be indicated to possible remote UEs (such as e.g., UE 206) or individual relay UEs (such e.g., UEs 210 and 220) are configured to determine and indicate that Uu link quality to possible remote UEs (such as e.g., UE 206). The indicated Uu link quality of a relay UE may be simple qualitative information such as adequate, good, or excellent levels, assuming that UE with inadequate link quality is not selected to act or stop acting as relay UE. The Uu link quality is determined based on actual UL/DL radio measurements as well as power range class, available capacity, and capability of relay UE and serving eNB. Such determinations could be, for example, where the available capacity is a measure of available relay UE ProSe discovery resources and, for example, where the capability of relay and serving eNB is a measure of whether the serving eNB supports discovery and/or whether the UE supports acting as a relay.

So, for instance, referring to FIG. 2, UE 206, could represent a remote UE as it exits cell 202 and cannot avail itself of cell 202 after it leaves the reach of eNB 204. As such, remote UE 206 would, under this disclosure, connect to eNB 204 via some UE still within the cell and capable, using the measures described herein, of acting as a sutiable relay. For purposes of this discussion, perhaps UE 210 and UE 220 are potential relay UEs but in the end for example UE 210 is chosen as the relay over UE 220.

Based on the network-coverage status of the individual cells the serving eNB 204 is providing, the serving eNB 204 may configure possible remote UEs (such as e.g., UE 206) with some measurement threshold(s) or threshold offset(s) coupled with some measurement timer(s) or timer offset(s) specific to relay UE discovery and selection as follows. The options using offset(s) refer to offsetting corresponding parameter(s) specified for the current handover related neighboring-cell measurements for triggering measurement for UE relay discovery and selection. Note that offset is used when comparing current measurement and neighbor relay UE's measurement, for example, when a neighbor relay UE's measurement is better than the current measurement plus this offset, the UE may select to that neighbor relay UE.

In case the serving cell 202 is an isolated cell or a cell located at the edge or border at the network coverage, the aforementioned measurement control parameters are configured to allow the remote UE (such as e.g., UE 206) for more proactive UE relay discovery and selection (with lower constraints or negative offsets). Otherwise, higher constraints or positive offsets may be configured to the remote UE for a more conservative or preventive UE relay discovery and selection. Accordingly, a negative offset will enable proactive relay UE selection as lower neighbor relay UE measurement will meet the selection condition.

In one option, the aforementioned measurement control parameters are configured to individual possible remote UEs (such e.g., UEs 210 and 220) by the serving cell 202 with explicit hard constraints which may be specified for different kinds of user priorities and service requirements.

In an alternative option, the remote UE (such as e.g., UE 206) may be configured with reference constraints for the aforementioned control parameters and allowed to derive the actual values adapted to indicated network coverage status of the serving cell, Uu link quality, actual service needs, and service requirements as well as an associated priority of the remote UE (such as e.g., UE 206) according to preconfigured rules.

For example, depending on urgency and importance of the current service, need of minimizing service interruption or other QoS related requirements, and so forth, the remote UE (such as e.g., UE 206) may adjust the aforementioned control parameters either to speed up the relay UE discovery and selection with a possible early trigger aiming for the earliest found suitable option or to carry out a more thorough relay UE discovery and selection to find the best possible option. The eNB 204 may configure individual remote UEs (such as e.g., UE 206) when still being in coverage with the possibility to select the only possible relay UE (such as e.g., UE 210) which indicates to have the capability of being a candidate relay UE, e.g., at least good Uu radio link quality.

A second case is where the remote UE 208 is served by the eNB 204 via the relay UE 212. Such a case can correspond to the mobility scenario where a UE 208 is going from out-of-coverage to in-coverage.

For remote UE 208 served by eNB 204 via the relay UE 212, two factors can affect the remote decision of UE 208 to select another relay or cell, specifically, the PC5 link's quality and the relay UE's Uu link quality.

To control the remote UE's measurement process of either remaining connected to the eNB 204 by relay UE 212 or by direct connection to that eNB 204, the remote UE 208 would either undertake relay UE reselection or switch to cellular access mode, and a similar analogy to the operation described above can be applied for introducing and configuring measurement and selection control parameters to the remote UE on PC5 adapted to indicated network coverage status of the serving cell, Uu radio link quality of relay UEs, actual service needs and service requirements, as well as an associated priority of the remote UE.

For instance, remote UE 208 upon moving into cell 202 might disconnect from relay UE 212 to connect directly to eNB 204. On the other hand, if UE 228 is thought of as the remote UE, it might be connected to either one of UE 212 or UE 214 and chose the other if a reselection process determines that connecting to UE 214 would be preferable over UE 212.

For instance, if the remote UE 228 has urgent need for L3 relay to make a phone call, then the remote UE 228 may select the first suitable relay UE regardless of indicated Uu link quality to avoid any additional delay. The remote UE 228 which is relayed by a relay UE with an adequate Uu link quality may be configured with (or configured to determine or derive) lower triggering threshold to carry out measurements for possible relay UE reselection or switch to cellular access mode more often compared to the case in which the relay UE has better Uu link quality.

The aforementioned measurement and selection control parameters for the remote UE in one option may be determined and configured by the serving eNB via the relay UE or by the relay UE over PC5 signaling during/after relay connection's setup, or alternatively included in relay UE's discovery messages.

In an alternative option, the remote UE 208 may be pre-configured with reference constraints for the aforementioned control parameters and allowed to derive the actual values adapted to relevant control information (Uu link quality, network coverage status of the serving cell) provided by the relay UE 212, actual service needs and service requirements as well as associated priority of the remote UE 208.

For both the first and second case examples discussed above, when Uu link quality of the relay UE 212 becomes inadequate, the relay UE 212 may trigger the remote UE 208, which is being served by the relay UE 212, to search for a new relay UEs/cells so that remote UE 208 (or UE 228) can switch to another relay UE 214 or cell before the current relay UE relaying ability breaks down. The relay UE 212 may notify the remote UE UE 208 (or UE 228) of its evaluation decision. This can be done, for example, by using one bit in the discovery message to indicate if the remote UE's need to start monitoring other relay UEs/cells, or can be done, for example, by signaling to the remote UE 208 (or UE 228) through the established PC5 signaling.

A third case, another scenario besides moving in or out of the cell, is where a UE 228 moves, in a direction we can label as "horizontal", continuously from an out-of-coverage location to another out-coverage location 230, where it at first relies on UE 214 to act as a relay UE and maintain a link to the eNB 204 (UE 214 link to eNB 204 not shown or numbered) and then perhaps switches to UE 232 to act as a relay UE and maintain that link to eNB 204 (the link also not shown or numbered).

Such a scenario would involve initial relay UE 214 and potential UE 232 both considered as potential relay UEs as a reselection process is commenced.

FIG. 3 is a flow diagram of an example of an embodiment of a method to control relay UE discovery and selection for a remote UE.

When a user equipment's movement toward the edge of the cell, where it does not discover another cell, the user equipment will seek to discover another user equipment that would be suitable as a relay to continue service between the user equipment which is moving, referred to as a remote user equipment.

The network control involves the control of the remote UE measurement process and the actual relay UE selection/reselection process. In addition to Uu link quality of a relay UE, one of the criteria for network control is based on the so called "network coverage status" from a cell perspective (e.g. normal coverage or isolated/edge of network coverage). Other criteria for network control could be based on preconfigured QoS parameters or service continuity requirements (i.e. minimized service interruption). Measurement control of remote UE could be based on preconfigured or dynamic signaled thresholds, offsets and/or associated time intervals.

From remote UE perspective, the remote UE is configured (by the serving network) to determine trigger conditions as well as perform determined radio measurement, discovery and selection or reselection of a relay UE on-the-fly dynamically adapted to: measured PC5 link quality towards relay UE, indicated Uu link quality of relay UE, indicated network coverage status related to individual serving cell (e.g., isolated, edge of coverage hole, or normal); preconfigured control thresholds, offsets and/or associated time intervals for measurement and selection; preconfigured QoS parameters including minimized service interruption requirements.

Thus, a method to control relay UE discovery and selection for a remote UE 300 has a serving base station configured to be aware of the network coverage status relating to cells that the serving base station provides 302. That network coverage may specify whether the cell is an isolated cell or not 304. Moreover that network coverage may specify whether the cell is at some edge or the border of network coverage 306. The serving eNB may also indicate the network-coverage status to relevant UEs (such as e.g., potential relay UEs and remote UEs inside the cell coverage) using SIB or dedicated signaling. Upon receiving this indication, relevant UEs may determine, for example, whether to adjust configuration parameters related to the relay UE discovery and selection or not, and act accordingly.

The base station initiates and selects a relay user equipment 308, where initiating and selecting means that the eNB allows and configures a selected UE to act as a relay UE. The process can be done either by the serving eNB determining based on the network coverage status of the serving cell and the Uu link quality of individual relay UE candidates and configuring selected individual UE candidates to act as possible relays 310 or eNB could configure the potential individual relay user equipment (for example allowing the relay UE to make the decision) to determine by itself, e.g., upon receiving the indication of the network coverage status, whether the UE can act as a relay or not and indicate to the eNB that they can serve as possible relays 312.

The eNB may then confirm those UEs which are selected to act as relays 314. In one option, the serving base station determines and configures the individual relay user equipment with Uu link quality to be indicated to remote UE. In another option, individual relay user equipment are configured to determine the Uu link quality indication. Thereafter, the selected individual relay user equipment can indicate Uu link quality to the possible remote user equipment 316, assuming that Uu link quality is at least adequate. The eNB may tell a remote UE in coverage to select only relay UEs which have a certain level of Uu link quality, as indicated by relay UEs. The selected individual relay user equipment may be configured to also indicate the network coverage status of the serving cell to the possible remote UE.

Note that configuring the relay UE to send an indication of the radio interface link quality of the relay UE to the remote UE might be optional if tight network control is preferred. Also note that identifying the remote UE may be optional, too, if the network uses broadcast signaling to configure UE regarding the initiating and radio measurement related parameters.

The indicated radio interface link quality of the relay user equipment can be either expressed quantitatively or qualitatively, where qualitatively can be designated with terms such as adequate, good, excellent, etc. 318. Thus, user equipment with inadequate radio interface link quality would either be not selected to act as relay user equipment or if they are acting as relay user equipment then they would stop acting as relay user equipment 320.

The radio interface link quality could be determined based on one of the following: the actual uplink/downlink ratio measurements; the power range class; available capacity; and the capability of a candidate relay user equipment and the serving base station 322.

Based on the network coverage status of the individual cells that the serving base station provides, the serving base station may configure possible remote user equipment with some measurement threshold or with some threshold offset 324. These configurations could be coupled with some measurement time or some timer offset which are specific to discovery and/or selection of relay user equipment by the remote UE itself 326. For the remote UE selecting the relay UE, the remote UE must be provided with the Uu link quality as an input. Another input would be based on the remote UE itself doing the measurement of the direct interface between the remote UE and the relay UE, such as for example the PC5 link quality.

Embodiments of the current invention from the perspective of a remote UE can be summarized for example as the remote UE being configured by the serving network to determine trigger conditions as well as perform radio measurement, discovery, and selection or reselection of a relay UE dynamically on-the-fly, as determined.

The determination is based on or adapted to, for example, indicated Uu link quality, indicated network coverage status of the serving cell (e.g., isolated, edge of coverage hole, or normal), preconfigured control thresholds, offsets and/or associated time intervals for measurement and selection, and preconfigured QoS parameters including minimized service interruption requirements.

The configured offsets/thresholds or associated time intervals may for example be semi-static or dynamic, as configured and controlled by the network. The latter option considers that those parameters can be derived by remote UE on-the-fly, for example, as functions of indicated Uu link quality, indicated network coverage status of the serving cell, and/or some QoS related parameters/priorities.

Additionally, a technical effect of one or more of the exemplary embodiments disclosed herein is providing an energy-efficient and QoS enhanced measurement and control for relay selection and reselection of remote UE which can be either in or out of network coverage.

Another technical effect of one or more of the examples of embodiments disclosed herein is preventing a remote UE from unnecessarily performing relay discovery and relay selection/reselection thereby conserving UE power and minimizing service interruption.

Another technical effect of one or more of the examples of embodiments disclosed herein is the proposed initiation and selection of relay UEs as well as configuration and control of remote UEs with smart triggers and other control parameters for radio measurement, discovery and selection of suitable relay UE which are adapted to network coverage status of the serving cell, Uu link quality of relay UE, actual service needs, and service requirements, as well as an associated priority of the remote UE which help reducing protocol and processing overhead and thus enhancing energy efficiency for the UE-to-Network relay of interest.

Thus, we have developed the current invention, an example of an embodiment of which can be referred to as item 1, which is a method comprising determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An example of a further embodiment, which can be referred to as item 2, is the method of item 1 wherein the determining the network coverage further comprises ascertaining whether the cell is isolated, whether the cell is at an edge of the network coverage, or both.

An example of a further embodiment, which can be referred to as item 3, is the method of item 1 further comprising indicating the network coverage status of the serving cell to the relay UE and the remote UE using common broadcast signaling, dedicated signaling, or both.

An example of a further embodiment, which can be referred to as item 4, is the method of item 1 wherein the indication sent by the relay UE may be determined and configured to the relay UE by the serving eNB or determined by the relay UE.

An example of a further embodiment, which can be referred to as item 5, is the method of item 1 wherein the indication further comprises: the network coverage status of the serving cell and/or control information specific to the serving cell relating to relay UE discovery and selection for remote UE.

An example of a further embodiment, which can be referred to as item 6, is the method of item 1 wherein the radio measurement comprises one or more semi-static or dynamic measurement control information, and one or more associated measurement timers or timer offsets.

An example of a further embodiment, which can be referred to as item 7, is the method of item 1 wherein the dynamic measurement comprises configuring the remote UE to adjust or derive actual values for control information adapted to the indicated Uu link quality of the relay UE, network coverage status of the serving cell, actual service needs, and service requirements, as well as an associated priority of the remote UE.

An example of another embodiment, which can be referred to as item 8, is method of item 1 wherein control information comprises at least one of: one or more thresholds; one or more offsets; and one or more associated time intervals.

An example of another embodiment, which can be referred to as item 9, is method comprising receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An example of a further embodiment, which can be referred to as item 10, is the method of item 9, wherein the received network coverage status indicates whether the cell is isolated, whether the cell is at an edge of the network coverage, or both.

An example of a further embodiment, which can be referred to as item 11, is the method of item 9, further comprising wherein receiving the network coverage status of the serving cell to the relay UE and the remote UE is by common broadcast signaling, dedicated signaling, or both.

An example of a further embodiment, which can be referred to as item 12, is the method of item 9, wherein the indication further comprises: the network coverage status of the serving cell and/or control information specific to the serving cell relating to relay UE discovery and selection for remote UE.

An example of a further embodiment, which can be referred to as item 13, is the method of item 9, wherein the radio measurement comprises one or more semi-static or dynamic measurement control information, and one or more associated measurement timers or timer offsets.

An example of a further embodiment, which can be referred to as item 14, is the method of item 9, further comprising configuring the remote UE to adjust or derive actual values for control information adapted to the indicated Uu link quality of the relay UE, network coverage status of the serving cell, actual service needs, and service requirements, as well as an associated priority of the remote UE.

An example of another embodiment, which can be referred to as item 15, is method of item 9 wherein control information comprises at least one of: one or more thresholds; one or more offsets; and one or more associated time intervals.

An example of another embodiment of the present invention, which can be referred to as item 16, is an apparatus comprising at least one processor and at least one memory including computer program code, wherein the at least one memory and the computer code are configured, with the at least one processor, to cause the apparatus to at least perform the following: determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An example of another embodiment of the present invention, which can be referred to as item 17, is an apparatus comprising at least one processor and at least one memory including computer program code, wherein the at least one memory and the computer code are configured, with the at least one processor, to cause the apparatus to at least perform the following: receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An example of another embodiment of the present invention, which can be referred to as item 18, is an apparatus comprising: means for determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, means for initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, means for controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection. Furthermore, an apparatus can comprise means for performing any of the methods of items 1 to 8 (including combination of these methods).

An example of another embodiment of the present invention, which can be referred to as item 19, is an apparatus comprising: means for receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, means initiating and performing radio measurement for relay UE discovery and selection; ascertaining whether the remote UE is within network coverage or out of network coverage of the wireless communications network; and determining whether the relay UE discovery and selection is an initial relay UE selection or a reselection; means for receiving an indication of the radio interface link quality of the one or more possible relay UEs; based on the indication, means for selecting a relay UE from the one or more possible relay UEs a needed service based on the radio measurement; and means for communicating by the remote UE with the wireless communications network via the selected relay UE. Furthermore, an apparatus can comprise means for performing any of the methods of items 9 to 15 (including combination of these methods).

An example of another embodiment of the present invention, which can be referred to as item 20, is a computer program product embodied on a non-transitory computer-readable medium in which a computer program is stored that, when being executed by a computer, is configured to provide instructions to control or carry out determining, by an eNB, network coverage status relating to a cell served by eNB within a wireless communications network, wherein the cell contains one or more UEs, and wherein the eNB supports UE-to-Network relay for a remote UE using direct device-to-device communication between the remote UE and a relay UE connected to the serving cell; based on the determined network coverage status, initiating and selecting at least one UE of the one or more UEs to act as a relay UE, wherein initiating and selecting the relay UE comprises at least one of: evaluating radio interface link quality of the relay UE and configuring the relay UE to send an indication of the radio interface link quality of the relay UE to the remote UE; based on the determined network coverage status and selection of relay UE, controlling by the eNB the remote UE for the relay UE discovery and selection either directly or via the relay UE, wherein controlling the remote UE comprises at least one of: identifying the remote UE and configuring the remote UE to determine initiating and to perform radio measurement for relay UE discovery and selection.

An example of another embodiment of the present invention, which can be referred to as item 21, is a computer program product embodied on a non-transitory computer-readable medium in which a computer program is stored that, when being executed by a computer, is configured to provide instructions to control or carry out the receiving, by a remote UE associated with a wireless communications network from an eNB or from one or more possible relay UEs, control information for relay UE discovery and selection, and network coverage status of a cell served by the eNB, wherein the one or more possible relay UEs is one of at least one UE in the cell served by the eNB; based on the received the control information and the network coverage status, initiating and performing radio measurement for relay UE discovery and selection; ascertaining whether the remote UE is within network coverage or out of network coverage of the wireless communications network; and determining whether the relay UE discovery and selection is an initial relay UE selection or a reselection; receiving an indication of the radio interface link quality of the one or more possible relay UEs; based on the indication, selecting a relay UE from the one or more possible relay UEs a needed service based on the radio measurement; and communicating by the remote UE with the wireless communications network via the selected relay UE.

An example of a further embodiment, which can be referred to as item 22, is a wireless communication system which includes the apparatus of item 16 and/or the apparatus of item 17.

In another example, a computer program comprises program code for executing a method according to any of items 1 to 8 or 9 to 15. A further example is the computer program according to this paragraph, wherein the computer program is a computer program product comprising a computer-readable medium bearing computer program code embodied therein for use with a computer.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes examples of embodiments of the invention, these descriptions should not be viewed in a limiting sense. Rather, there are several variations and modifications which may be made without departing from the scope of the present invention.

Embodiments of the present invention may be implemented in software, hardware, application logic, or a combination of software, hardware, and application logic. The software, application logic and/or hardware may reside on any of the elements described in FIG. 1 or any of the devices shown in FIG. 2 or on some other device not pictured for example. If desired, part of the software, application logic and/or hardware may reside on any of the elements described in FIG. 1 or any of the devices shown in FIG. 2 or on some other device not pictured for example, part of the software, application logic and/or hardware may reside on any of the elements described in FIG. 1 or any of the devices shown in FIG. 2 or on some other device not pictured for example, and part of the software, application logic and/or hardware may reside on modules not depicted herein or on any combination of modules which would permit the performance of the invention.

In an example of an embodiment, the application logic, software, or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

Any of the examples of embodiments above can be performed by the use of an apparatus of, wherein a processor comprises at least one memory that contains executable instructions that if executed by the processor cause the apparatus to perform any of the various items described above.

Such an apparatus can comprise one or more processors and one or more memories that include computer program code. The one or more memories and the computer program code can be configured, with the one or more processors, to cause the apparatus to perform at least any of the various items described above.

Moreover, the invention can be practiced by a computer program product comprising a computer-readable storage medium bearing computer program code embodied therein for use with a computer, the computer program code comprising code for performing any of the various items described above.

A computer program, comprising code for performing any of the various items described above when the computer program is run on a processor.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A method comprising:
   determining, by a base station, network coverage status relating to a cell served by the base station within a wireless communications network,
      wherein the cell contains one or more user equipments, and
      wherein the base station supports user equipment-to-network relay for a remote user equipment using direct device-to-device communication between the remote user equipment and a relay user equipment connected to the serving cell;
   based on the determined network coverage status, initiating and selecting, by the base station, at least one user equipment of the one or more user equipments to act as a relay user equipment, wherein initiating and selecting the relay user equipment comprises at least one of:
      evaluating radio interface link quality of the relay user equipment; or
      configuring the relay user equipment to send an indication of the radio interface link quality of the relay user equipment to the remote user equipment;
   based on the determined network coverage status and selection of relay user equipment, controlling by the base station the remote user equipment for the relay user equipment discovery and selection either directly or via the relay user equipment, wherein controlling the remote user equipment comprises at least one of:
      identifying the remote user equipment; or
      configuring the remote user equipment to determine initiating and to perform radio measurement for relay user equipment discovery and selection.

2. The method of claim 1, wherein the determining the network coverage further comprises ascertaining whether the cell is isolated, whether the cell is at an edge of the network coverage, or both.

3. The method of claim 1, further comprising:
   indicating, by the base station, the network coverage status of the serving cell to the relay user equipment and the user equipment using common broadcast signaling, dedicated signaling, or both.

4. The method of claim 1, wherein the indication sent by the relay user equipment may be determined and configured to the relay user equipment by the serving base station or determined by the relay user equipment.

5. The method of claim 1, wherein the indication further comprises: the network coverage status of the serving cell and/or control information specific to the serving cell relating to relay user equipment discovery and selection for remote user equipment.

6. The method of claim 1, wherein the radio measurement comprises one or more semi-static or dynamic measurement control information, and one or more associated measurement timers or timer offsets.

7. The method of claim 6, wherein the dynamic measurement comprises configuring the remote user equipment to adjust or derive actual values for control information adapted to the indicated Uu link quality of the relay user equipment, network coverage status of the serving cell, actual service needs, and service requirements, as well as an associated priority of the remote user equipment.

8. The method of claim 1, wherein control information comprises at least one of: one or more thresholds; one or more offsets; or one or more associated time intervals.

9. A method comprising:
   receiving, by a remote user equipment associated with a wireless communications network from a base station or from one or more possible relay user equipments, control information for relay user equipment discovery and selection, and network coverage status of a cell served by the base station,
      wherein the one or more possible relay user equipments is one of at least one user equipment in the cell served by the base station;
   based on the received the control information and the network coverage status, initiating and performing radio measurement for relay user equipment discovery and selection; ascertaining whether the remote user equipment is within network coverage or out of network coverage of the wireless communications network; and determining whether the relay user equipment discovery and selection is an initial relay user equipment selection or a reselection;
   receiving an indication of a radio interface link quality of the one or more possible relay user equipments;
   based on the indication, selecting a relay user equipment from the one or more possible relay user equipments a needed service based on the radio measurement; and
   communicating by the remote user equipment with the wireless communications network via the selected relay user equipment.

10. The method of claim 9, wherein the received network coverage status indicates whether the cell is isolated, whether the cell is at an edge of the network coverage, or both.

11. The method of claim 9, wherein receiving the network coverage status of the serving cell to the relay user equipment and the remote user equipment is by common broadcast signaling, dedicated signaling, or both.

12. The method of claim 9, wherein the indication further comprises: the network coverage status of the serving cell and/or control information specific to the serving cell relating to relay user equipment discovery and selection for remote user equipment.

13. The method of claim 9, wherein the radio measurement comprises one or more semi-static or dynamic measurement thresholds or threshold offsets, and one or more associated measurement timers or timer offsets.

14. The method of claim 9, further comprising configuring the remote user equipment to adjust or derive actual values for control information adapted to the indicated Uu link quality of the relay user equipment, network coverage status of the serving cell, actual service needs, and service requirements, as well as an associated priority of the remote user equipment.

15. The method of claim 9, wherein control information comprises at least one of: one or more thresholds; one or more offsets; or one or more associated time intervals.

16. An apparatus, comprising at least one processor and at least one memory including computer program code, wherein the at least one memory and the computer code are configured, with the at least one processor, to cause the apparatus to at least perform the following:
   determining, by a base station, network coverage status relating to a cell served by the within a wireless communications network, wherein the cell contains one or more user equipments, and
      wherein the base station supports user equipment-to-network relay for a remote user equipment using direct device-to-device communication between the remote user equipment and a relay user equipment connected to the serving cell;
   based on the determined network coverage status, initiating and selecting, by the base station, at least one user equipment of the one or more user equipments to act as a relay user equipment, wherein initiating and selecting the relay user equipment comprises at least one of:
　evaluating radio interface link quality of the relay user equipment; or
　configuring the relay user equipment to send an indication of the radio interface link quality of the relay user equipment to the remote user equipment;
based on the determined network coverage status and selection of relay user equipment, controlling by the base station the remote user equipment for the relay user equipment discovery and selection either directly or via the relay user equipment, wherein controlling the remote user equipment comprises at least one of:
　identifying the remote user equipment; or
　configuring the remote user equipment to determine initiating and to perform radio measurement for relay user equipment discovery and selection.

17. A computer program product embodied on a non-transitory computer-readable medium in which a computer program is stored that, when being executed by a computer, is configured to provide instructions to control or carry out the method of claim 1.

18. A computer program product embodied on a non-transitory computer-readable medium bearing computer program code that, when being executed by computer, is configured to provide instructions to control or carry out the method of claim 9.

19. A wireless communications system comprising the apparatuses of claim 16.

* * * * *